US008719571B2

(12) United States Patent
Clay (10) Patent No.: US 8,719,571 B2
(45) Date of Patent: May 6, 2014

(54) SYSTEMS AND METHODS FOR PROVIDING SECURE MULTICAST INTRA-CLUSTER COMMUNICATION

(75) Inventor: Philip Bryan Clay, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 229 days.

(21) Appl. No.: 13/218,186

(22) Filed: Aug. 25, 2011

(65) Prior Publication Data
US 2013/0054966 A1    Feb. 28, 2013

(51) Int. Cl.
*H04L 29/06* (2006.01)
(52) U.S. Cl.
USPC ............... 713/169; 713/165; 713/171; 726/2; 726/3; 726/5; 726/8
(58) Field of Classification Search
None
See application file for complete search history.

(56) References Cited

U.S. PATENT DOCUMENTS

| | | | | |
|---|---|---|---|---|
| 7,181,017 | B1 * | 2/2007 | Nagel et al. ................. | 380/282 |
| 7,957,320 | B2 * | 6/2011 | Konig et al. ................. | 370/254 |
| 8,046,579 | B2 * | 10/2011 | Kresina ........................ | 713/155 |
| 8,126,145 | B1 * | 2/2012 | Tewari et al. ................ | 380/255 |
| 8,140,843 | B2 * | 3/2012 | Holtzman et al. ........... | 713/157 |
| 8,316,237 | B1 * | 11/2012 | Felsher et al. ............... | 713/171 |
| 8,533,803 | B2 * | 9/2013 | Cha et al. ..................... | 726/8 |
| 2005/0246393 | A1 | 11/2005 | Coates et al. | |
| 2007/0043667 | A1 * | 2/2007 | Qawami et al. ............. | 705/50 |
| 2008/0175388 | A1 | 7/2008 | Okabe et al. | |
| 2008/0310619 | A1 * | 12/2008 | Scheidt et al. .............. | 380/28 |
| 2009/0164782 | A1 | 6/2009 | Pourzandi et al. | |
| 2010/0131411 | A1 * | 5/2010 | Jogand-Coulomb et al. ... | 705/54 |
| 2010/0250922 | A1 * | 9/2010 | Bao et al. .................... | 713/158 |

OTHER PUBLICATIONS

Younis, Mohamed; Farrag, Osama. Tiered Authentication of Multicast Traffic in Wireless Ad-Hoc Networks. GLOBECOM 2009. Pub. Date: 2009. Relevant pp. 1-7. Found on the World Wide Web at: http://ieeexplore.ieee.org/stamp/stamp.jsp?tp=&arnumber=5425260.*
International Search Report and Written Opinion issued for PCT/US2012033904, dated Jun. 20, 2012, 8 pages.
T. Wu, "The Secure Remote Password Protocol," Computer Science Department, Stanford University, Nov. 11, 1997, 1998 Internet Society Symposium on Network and Distributed System Security, pp. 1-17.
T. Wu, "SRP-6: Improvements and Refinements to the Secure Remote Password Protocol," Oct. 29, 2002, pp. 1-5.

* cited by examiner

*Primary Examiner* — Cordelia Zecher
*Assistant Examiner* — Jeremiah Avery
(74) *Attorney, Agent, or Firm* — LeClairRyan, a Professional Corporation (57) ABSTRACT

Systems and methods which facilitate secure multicast communications between any valid node of a cluster using authentication between a node joining the cluster and any single node which is validly part of the cluster are disclosed. In accordance with embodiments, a cluster key is utilized to provide security with respect to intra-cluster communications. The cluster key of embodiments is shared by a node which is already part of the cluster with a node joining the cluster only after these two nodes mutually authenticate one another. The mutual authentication handshake of embodiments implements a protocol in which a session key is calculated by both nodes, thereby providing a secure means by which a cluster key may be shared. Having the cluster key, each node of the cluster is enabled to securely communicate with any other node of the cluster, whether individually (e.g., unicast) or collectively (e.g., multicast), according to embodiments.

17 Claims, 4 Drawing Sheets

SYSTEMS AND METHODS FOR PROVIDING SECURE MULTICAST INTRA-CLUSTER COMMUNICATION

TECHNICAL FIELD

The present invention relates generally to intra-cluster communication and, more particularly, to providing secure multicast intra-cluster communication.

BACKGROUND OF THE INVENTION

Various system configurations exist in which a cluster of different nodes communicate with each other, wherein a node is an operating unit (e.g., a processor-based system), operable to provide a desired function, service, or operation, or portion thereof, and which may cooperate with other nodes to form a cluster. For example, data storage systems often include a plurality of storage devices present at different nodes of the data storage system. Such a data storage system may be implemented using a variety of storage architectures, such as a network-attached storage (NAS) environment, a storage area network (SAN), a direct-attached storage environment, and combinations thereof. Nodes of a data storage system may comprise processor-based systems, such as a file server system, a computer appliance, a computer workstation, etc. Storage devices at the different nodes may comprise disk drives, flash memory, optical memory, etc. Selected ones of the storage devices may be organized as a storage array in accordance with the storage architecture. Nodes hosting the storage devices of a storage array as well as other network-connected devices may thus comprise a cluster of nodes operable cooperatively to provide a data storage system.

In order to operate as a cluster, nodes of a cluster communicate with each other. Such communication may include various point-to-point communications (e.g., single node to single node or unicast communication) and multicast communications (e.g., single node to multiple node). Accordingly, to effectively cooperate to provide desired operation each node of a cluster may need to have the capability to communicate with any and all other nodes of the cluster. Such communication, however, may traverse unsecured links, such as public or other network links (e.g., the Internet, the public switched telephone network (PSTN), a local area network (LAN), a metropolitan area network (MAN), a wide area network (WAN), etc.). Such communications carried through such unsecured links may be susceptible to interception, eavesdropping, tampering, monitoring, sniffing, man-in-the-middle attack, relay attack, replay attack, etc.

Accordingly, various security protocols have been implemented in the past to facilitate communication between nodes of a cluster (i.e., intra-cluster communication). For example, Secure Sockets Layer (SSL) and Transport Layer Security (TLS) security protocols have been implemented by nodes of a cluster for securing intra-cluster communication. SSL and TLS are cryptographic protocols that provide communication security using asymmetric cryptography for privacy and a keyed message authentication code for message reliability. These security protocols, however, are point-to-point security protocols. That is, unique key sets are utilized with respect to each node pair. Accordingly, secure multicast communication is not provided through the use of SSL and TLS security protocols.

Although protocols have been developed which provide for securing multicast communications, such protocols heretofore have not provided sufficient security with respect to multicast communications and have not adequately accommodated dynamic association of nodes with clusters. One such protocol which has been used to provide security for communications is JGROUPS. JGROUPS provides a multicast protocol in which a "grouping" layer is added over a transport protocol. To provide security with respect to the multicast communications, JGROUPS implements its AUTH and ENCRYPT protocols. The AUTH protocol, however only provides one way authentication (i.e., only one node authenticates the other) using a single token-based authentication (e.g., password or other authentication credentials communicated over the unsecured link), thus an eavesdropper can monitor the communications and mimic the security handshake (e.g., replay attack) to establish a false authentication. The ENCRYPT protocol uses a clusterKey to encrypt all multicast communications. The clusterKey of the ENCRYPT protocol, however, is provided to any node which provides its own public key and requests the clusterKey. Accordingly, even with AUTH and ENCRYPT protocols implemented by JGROUPS, a man-in-the-middle may easily join the cluster and thus the security provided with respect to multicast communications is somewhat illusory.

BRIEF SUMMARY OF THE INVENTION

The present invention is directed to systems and methods which facilitate secure multicast communications between any valid node of a cluster using authentication between a node joining the cluster and any single node which is validly part of the cluster. In accordance with embodiments of the invention, a cluster key (e.g., a symmetrical cryptographic key) is utilized to provide security with respect to intra-cluster communications. The cluster key of embodiments is shared by a node which is already part of the cluster with a node joining the cluster only after these two nodes mutually authenticate one another. The mutual authentication handshake of embodiments implements or is otherwise associated with a protocol in which a session key is calculated by both nodes, thereby facilitating a secure link between the nodes without the session key having been communicated over a network or other link. The session key is used to securely share the cluster key with the node joining the cluster by the node which is already part of the cluster after these two nodes mutually authenticate one another according to embodiments of the invention. Having the cluster key, each node of the cluster is enabled to securely communicate with any other node of the cluster, whether individually (e.g., unicast communication) or collectively (e.g., multicast communication).

From the foregoing it can be appreciated that embodiments of the invention facilitate nodes joining a cluster by authenticating against any node in the cluster. Embodiments of the invention do not rely on the use of a public key infrastructure (PKI) or certificates in providing authentication of nodes. Accordingly, the configuration and maintenance involved in a PKI or managing certificates is avoided. Embodiments herein, however, may utilize available authentication protocols, key agreement protocols, and/or encryption algorithms or portions thereof, albeit in a new methodology tailored or otherwise adapted for use in a cluster environment for multicast communication, to thereby leverage well tested and thoroughly documented base technologies.

Once authenticated, trust with respect to a joined node is established with the entire cluster of nodes. That is, the node joining the cluster essentially authenticates to the cluster as a logical unit in order to join. Thus, it is not necessary that the node joining the cluster authenticate against every node, or even more than one node, in the cluster according to embodiments herein, as would be required in an approach implementing a point-to-point type protocol. Once joined, nodes of the cluster are enabled to communicate with other nodes of the cluster using various messaging techniques including unicast and multicast messaging. In contrast to the operation of embodiments of the present invention, multicast communication techniques are not easily implemented in point-to-point type protocols.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

A brief description of the meaning of particular terms as used herein is provided below in order to aid the reader in better understanding the concepts of the invention as described in the discussion which follows. Although the following provides general meanings with respect to particular terms, it should be appreciated that additional meaning with respect to certain of the terms herein may be provided in the context of particular embodiments discussed below.

A cluster as used herein is a group of linked or otherwise associated nodes operable together to provide a desired function, service, or operation thereby, in many respects, forming a single logical entity. A node is a network-connected device operating unit, such as a processor-based system (e.g., computer, network appliance, etc.) and associated instruction set (e.g., software, firmware, application, etc.), operable to provide a desired function, service, or operation, or portion thereof, and which may cooperate with other nodes to form a cluster. Intra-cluster communication is communication, such as unicast communication and multicast communication, between two or more nodes of a cluster. Unicast communication is the sending of one or more message or information to a single network destination (e.g., node). Multicast communication is the sending of one or more message or information to a plurality of network destinations (e.g., nodes) by a single transmission.

As used herein, authentication is the process of one party (e.g., node) confirming the identity of another party (e.g., another node) whereas mutual authentication is the process of two parties (e.g., nodes) confirming the identity of each other. An authentication handshake is the dialog of messages between two parties (e.g., nodes) trying to authenticate one or the other (authentication) or both (mutual authentication). A key agreement protocol is a protocol whereby two or more parties (e.g., nodes) can agree on a key (e.g., cryptographic key used in encryption and/or decryption of data) in such a way that both influence the outcome, thereby facilitating separate calculation of a unique key (e.g., session key) without the need to communicate the unique key between the parties and thus avoiding eavesdropping and tampering. Eavesdropping is when a third party (e.g., node which is not part of a cluster) observes communication without the consent and/or knowledge of the parties (e.g., nodes of the cluster) involved in the communication. Tampering is when a third party (e.g., network-connected device which is not part of a cluster) changes or otherwise alters data while it is in-flight between communicating parties (e.g., nodes of the cluster) without the knowledge of the parties involved in the communication. Encryption is the process of transforming information (referred to as plaintext prior to encryption) using an algorithm (called cipher) to make it unreadable to anyone except those possessing special knowledge, usually referred to as a key (e.g., cryptographic key), whereas decryption is the process of transforming encrypted information back to plaintext.

Figure 1A:
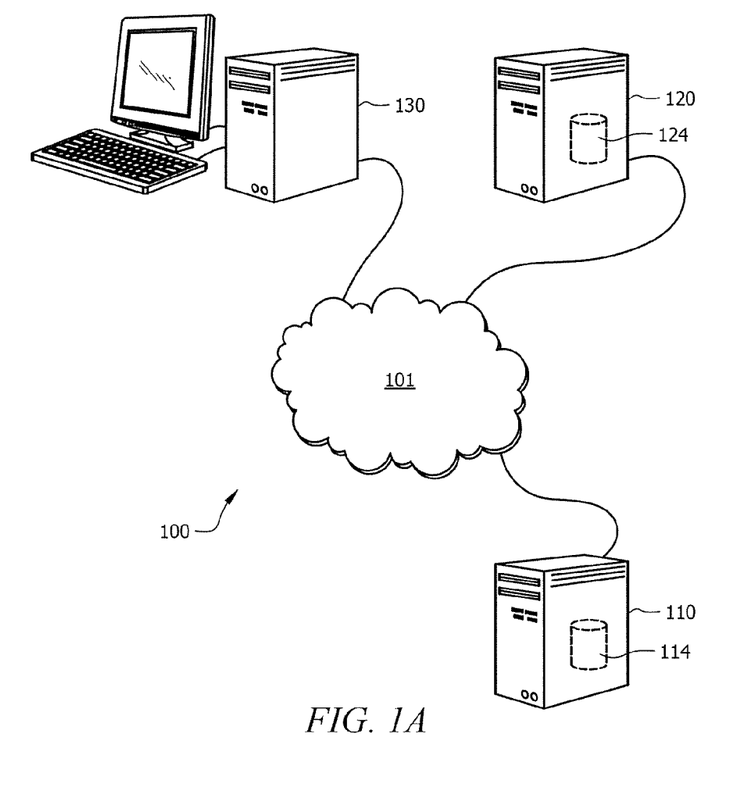
FIGS. 1A and 1B show block diagrams of systems adapted to enable each node of a cluster to securely communicate with any other node of the cluster according to embodiments of the invention.

Directing attention to FIG. 1A, system 100 is shown comprising a plurality of network-connected devices, shown as network-connected devices 110-130, coupled via network 101. Network-connected devices 110-130 may comprise processor-based systems, such as a file server system, a computer appliance, a computer workstation, etc. Accordingly, network-connected devices 110-130 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein. Network 101 may comprise various forms of communication infrastructure, such as the Internet, the PSTN, a LAN, a MAN, a WAN, a wireless network (e.g., a cellular communication network, a wireless LAN, etc.), and/or the like.

Various configurations of system 100 may be provided in which one or more cluster of nodes is formed from network-connected devices 110 and 120 to thereby provide a cluster environment, wherein cooperative operation of the cluster is facilitated through communication between the nodes of the cluster. For example, a data storage system may be formed from network-connected devices 110-130, wherein one or more storage device (e.g., storage devices 114 and 124)

present at network-connected devices 110 and 120 (e.g., disk drive, flash memory, optical memory, etc.) cooperate to provide a volume accessible to network-connected device 130. Network-connected devices 110 and 120 hosting storage devices of a storage array and client network-connected device 130 may thus comprise a cluster of nodes operable cooperatively to provide a data storage system.

Figure 1B:
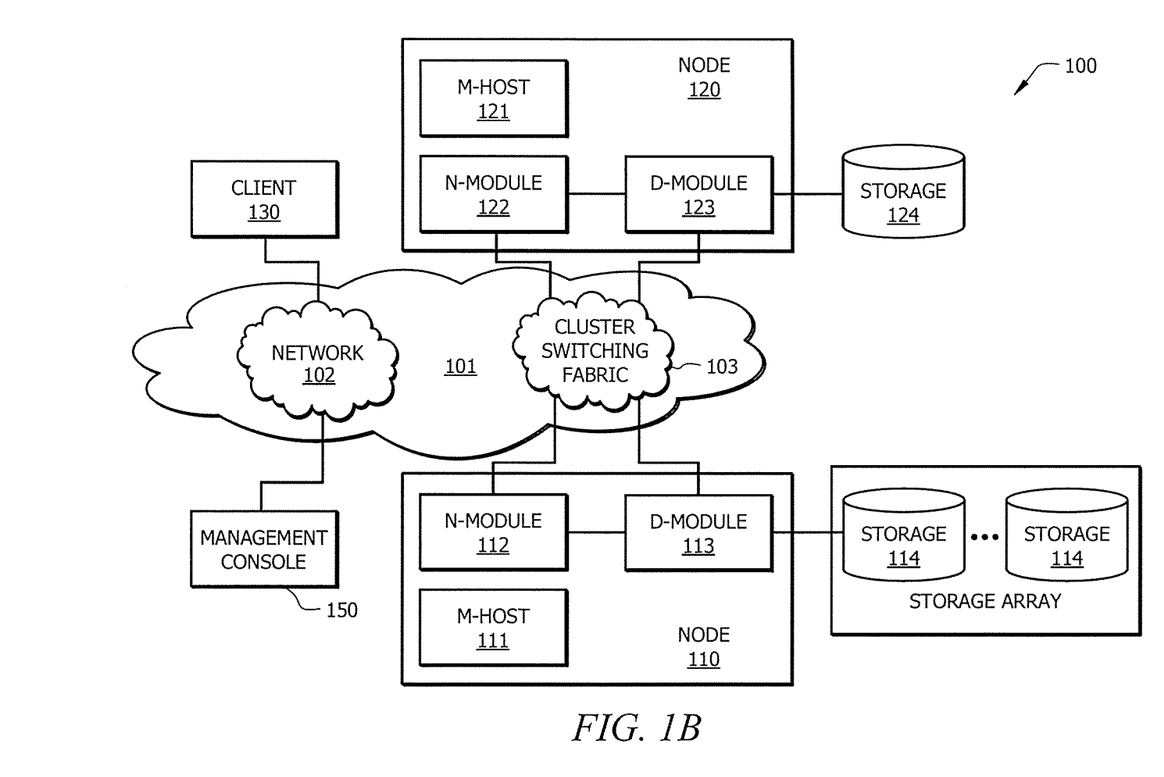

FIG. 1B provides a block diagram in which additional detail with respect to embodiments of system 100 adapted to enable each node of a cluster to securely communicate with any other node of the cluster. As stated above, system 100 may comprise two or more interconnected, such as network-connected devices 110 and 120 configured to provide access to data stored on a set of storage devices (shown as storage devices 114 and 124) constituting storage of system 100. Storage services may be provided by such nodes implementing various functional components that cooperate to provide a distributed storage system architecture of system 100.

Illustratively, nodes (e.g., network-connected devices 110 and 120) may be organized as one or more network elements (N-modules 112 and 122) and/or storage elements (D-modules 113 and 123) and a management element (M-host 111 and 121). N-modules may include functionality to enable nodes to connect to one or more clients (e.g., network-connected device 130) over computer network 101, while D-modules may connect to storage devices (e.g., as may implement a storage array). M-hosts may provide cluster communication services between nodes for generating information sharing operations and for presenting a distributed file system image for system 100. Functionality for enabling each node of a cluster to securely communicate with any other node of the cluster may be provided by M-hosts adapted according to embodiments of the invention.

It should be appreciated that network 101 may comprise various forms, and even separate portions, of network infrastructure. For example, network-connected devices 110 and 120 may be interconnected by cluster switching fabric 102 while network-connected devices 110 and 120 may be interconnected to network-connected device 130 by a more general data network (e.g., the Internet, a LAN, etc.).

It should also be noted that while there is shown an equal number of N and D-modules constituting illustrated embodiments of nodes, there may be a different number and/or type of functional components embodying nodes in accordance with various embodiments of the present invention. For example, there may be multiple N-modules and/or D-modules interconnected in system 100 that do not reflect a one-to-one correspondence between the modules of network-connected devices 110 and 120. Accordingly, the description of network-connected devices 110 and 120 comprising one N- and one D-module should be taken as illustrative only and it will be understood that the novel technique is not limited to the illustrative embodiment discussed herein.

Network-connected device 130 may be a general-purpose computer configured to interact with network-connected devices 110 and 120 in accordance with a client/server model of information delivery. To that end, network-connected device 130 may request the services of network-connected devices 110 and 120 by submitting a read or write request to the cluster node comprising the network-connected device. In response to the request, the node may return the results of the requested services by exchanging information packets over network 101. Network-connected device 130 may submit access requests by issuing packets using object-based access protocols, such as the Common Internet File System (CIFS) protocol, Network File System (NFS) protocol, Small Computer Systems Interface (SCSI) protocol encapsulated over TCP (iSCSI), and SCSI encapsulated over Fibre Channel (FCP) for instance. Preferably, network-connected devices 110 and 120 may implement a combination of file-based and block-based protocols to communicate with network-connected device 130.

System 100 may further include a management console (shown here as management console 150) for providing management services for the overall cluster. Management console 150 may, for instance, communicate with network-connected devices 110 and 120 across network 101 to request operations to be performed at the cluster nodes comprised of the network-connected devices, and to request information (e.g., node configurations, operating metrics) from or provide information to the nodes. In addition, management console 150 may be configured to receive inputs from and provide outputs to a user of system 100 (e.g., storage administrator) thereby operating as a centralized management interface between the administrator and system 100. In the illustrative embodiment, management console 150 may be networked to network-connected devices 110-130, although other embodiments of the present invention may implement management console 150 as a functional component of a node or any other processing system connected to or constituting system 100.

In a distributed architecture, network-connected device 130 may submit an access request to a node for data stored at a remote node. As an example, an access request from network-connected device 130 may be sent to network-connected device 120 which may target a storage object (e.g., volume) on network-connected device 110 in storage 114. To accelerate servicing of the access request and optimize cluster performance, network-connected device 120 may cache the requested volume in local memory or in storage 124. For instance, during initialization of network-connected device 120 as a cluster node, network-connected device 120 may request all or a portion of the volume from network-connected device 110 for storage at network-connected device 120 prior to an actual request by network-connected device 130 for such data.

As can be appreciated from the foregoing, in order to operate as a cluster (e.g., the aforementioned data storage system), network-connected devices 110-130 may communicate with each other. Such communication may include various forms of communication (e.g., point-to-point or unicast communication, multicast communication, etc.). Accordingly, to effectively cooperate to provide desired operation as a logical entity each node of a cluster is provided with the capability to communicate with any and all other nodes of the cluster according to embodiments of the invention. However, as network 101 may provide unsecured links, and thus such communications may be susceptible to interception, eavesdropping, tampering, monitoring, sniffing, man-in-the-middle attack, relay attack, replay attack, etc., embodiments of the invention provide secure communications (e.g., unicast and multicast) between any valid node of a cluster using authentication between a node joining the cluster and any single node which is validly part of the cluster.

In facilitating secure communications in which a node joining the cluster authenticates to the cluster as a logical unit in order to join, and thus secure communication may be provided between the joining node and any other valid node of the cluster, operation according to embodiments of the invention performs a mutual authentication session between a node joining the cluster and any single node validly part of the cluster. If the mutual authentication is successful, operation according to the embodiment communicates a cluster secret (e.g., cluster key) to the node joining the cluster using a secure communication channel unique to the mutual authentication session (e.g., using a session key calculated in association with the mutual authentication). In accordance with embodiments of the invention, possession of the cluster secret and the cluster credentials renders the node joining the cluster a cluster node and the cluster secret enables the cluster node to securely communicate with every other node which is validly part of the cluster.

Figure 2:
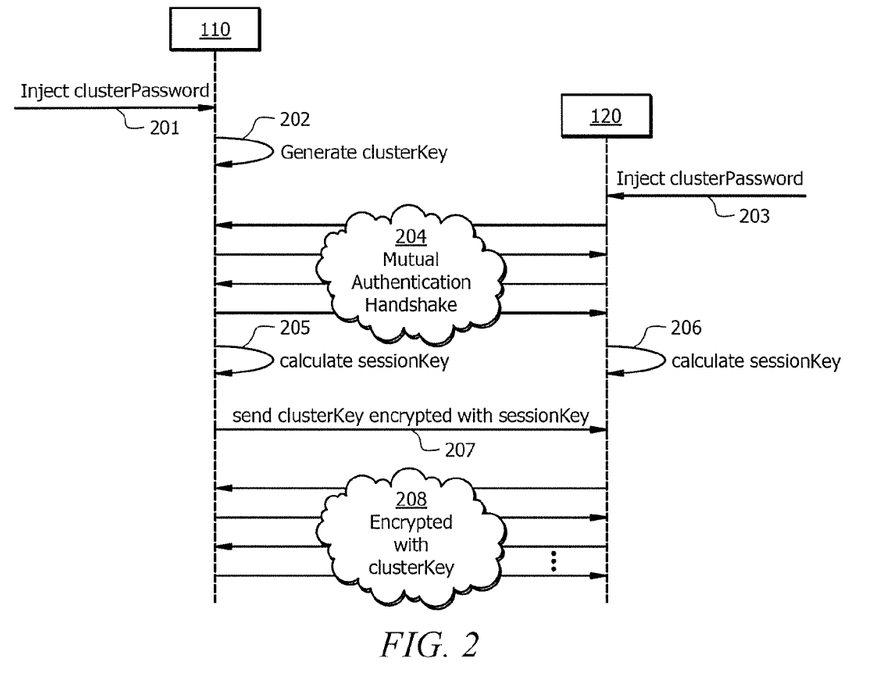
FIG. 2 shows a ladder diagram of a high level process flow enabling each node of a cluster to securely communicate with any other node of the cluster according to embodiments of the invention.

FIG. 2 shows a process flow by which each node of the cluster is enabled to securely communicate with any other node of the cluster, whether individually (e.g., unicast communication) or collectively (e.g., multicast communication) without the node joining the cluster authenticating against every node, or even more than one node, in the cluster according to embodiments herein. In particular, the ladder diagram of FIG. 2 provides an authentication handshake, session key agreement, and cluster key exchange that occurs according to an embodiment when a new node (e.g., network-connected device 120) joins a cluster in which another node (e.g., network-connected device 110) is the first member. It should be appreciated that functionality of the process flow illustrated in FIG. 2 may be implemented in software whereby elements of embodiments of the present invention are essentially code segments operable upon a processor-based or computer system (e.g., network-connected devices 110, 120, and/or 130) to perform the necessary tasks. The program or code segments can be stored in a computer readable medium (e.g., the aforementioned memory of a respective one of network-connected devices 110-130).

In accordance with the illustrated embodiment, it is assumed that each node which is to be validly part of a cluster possess cluster credentials (e.g., a cluster password). Accordingly, at process 201 of the illustrated embodiment cluster credentials are injected to establish that network-connected device 110 is a node to be validly included in the cluster. It should be appreciated that various techniques may be implemented for injection of cluster credentials. For example, a user of network-connected device 110 may type a cluster password on a console of the network-connected device during startup, a cluster password may be read from a file secured by various means (e.g., a file stored in memory of a universal serial bus (USB) memory device temporarily attached to the network-connected device), a cluster password may be derived from other, possibly secret, data, etc. Irrespective of the particular technique used for injecting the cluster credentials into the node, once having the appropriate credentials network-connected device 110 may validly join the cluster.

At process 202 network-connected device 110 determines that it is the first member in the cluster. Various techniques may be implemented for network-connected device 110 determining whether or not other nodes of the cluster are present. For example, network-connected device 110 may transmit one or more messages via network 101 to query for a response from another cluster node and/or network-connected device 110 may communicate with a management node or other cluster resource (e.g., management console, M-host, etc.) which maintains a database of member nodes. Additionally or alternatively, network-connected device 110 may monitor communications on network 101 to identify the presence of cluster communication traffic. Irrespective of how, network-connected device 110 of the illustrated embodiment determines that it is the first member of the cluster and thus at process 202 generates a new cluster secret (e.g., cluster key) to be used in securing cluster communications.

A cluster key as utilized according to embodiments herein may be generated using various techniques. For example, a cluster key may be generated using secure and/or random data. Systems often provide a way of generating pseudo-random data, such as may be seeded using data based upon CPU temperature, fan speed, mouse movement, network traffic, etc. Such pseudo-random data may be utilized in calculating a cryptographic key to be used as a cluster key herein. The cluster key generated according to embodiments of the invention comprises a symmetric key (i.e., provides symmetrical encryption wherein the same cryptographic key provides both encryption and decryption). Accordingly, configuration and maintenance involved in a PKI or managing certificates is avoided with respect to cluster communications using such a cluster key.

Having possession of the cluster secret and cluster credentials, network-connected device 110 is a member (albeit presently the only member) of the cluster. Network-connected device 110 may operate to announce that it is a member of the cluster, such as by broadcasting one or more messages, communicating with a management node or other cluster resource (e.g., management console, M-host, etc.) which maintains a database of member nodes, etc.

In the embodiment illustrated in FIG. 2, network-connected device 120 wishes to join the cluster of which network-connected device 110 is presently the only member. Accordingly, at process 203 of the illustrated embodiment cluster credentials are injected to establish that network-connected device 120 is a node to be validly included in the cluster. As discussed above with respect to network-connected device 110, various techniques may be implemented for injection of cluster credentials. Irrespective of the particular technique used for injecting the cluster credentials into the network-connected device, once having the appropriate credentials network-connected device 120 may validly join the cluster.

At process 204 network-connected device 120 determines that there is at least one member already in the cluster. As discussed above with respect to network-connected device 110, various techniques may be implemented for network-connected device 120 determining whether or not other nodes of the cluster are present. Irrespective of how, network-connected device 120 of the illustrated embodiment determines that at least one member is already a member of the cluster and thus at process 204 performs a mutual authentication handshake between network-connected device 120 (joining the cluster) and an existing cluster member (in this case, network-connected device 110) via network 101. The particular cluster node selected by a joining node for performing the mutual authentication herein may be selected based upon any of a number of criteria (e.g., a cluster node which is the oldest member of the cluster, a cluster node which is physically located most near the joining node, a cluster node for which a link having the fewest hops may be used, a cluster node having a lowest utilization, etc.). It should be appreciated that the cluster member selected for use in providing mutual authentication herein may be a peer node of the node joining the cluster. That is, a management node or other centralized cluster resource need not be utilized, but rather peer nodes which are validly part of the cluster (e.g., which have been mutually authenticated, if not the node which initiated the cluster secret, and which are in possession of the cluster secret) may each provide the authentication and cluster joining processing according to embodiments herein.

An authentication handshake as implemented according to embodiments of the invention results in mutual authentication of both network-connected device 120 and network-connected device 110. The use of such a mutual authentication handshake ensures that a cluster secret, as provided to valid members of the cluster, and/or credentials or other security information are not provided to an unauthorized network-connected device or other node not validly part of the cluster (e.g., a man-in-the-middle). Various mutual authentication protocols may be utilized in providing the authentication handshake of process 204. Details with respect to one such mutual authentication protocol are provided below with reference to the embodiment illustrated in FIG. 3. Irrespective of the particular mutual authentication protocol implemented, each of network-connected devices 110 and 120 are authenticated with respect to the other one of network-connected devices 120 and 110 by operation of the mutual authentication handshake of the illustrated embodiment. If at any time, network-connected device 110 or network-connected device 120 detects an authentication failure, the join process is preferably aborted.

In operation according to embodiments of the invention, both network-connected device 110 and network-connected device 120 derive a session secret (e.g., session key) as part of or in association with the mutual authentication handshake. Session secrets as utilized according to embodiments herein may be generated using various techniques. For example, a session key may be generated from data gathered during the authentication handshake. Details with respect to one such technique for session key generation are provided below with reference to the embodiment illustrated in FIG. 3. In operation according to embodiments of the invention cluster credentials, user derived information, information common to all nodes in the cluster, and other information which may present a detectable pattern or otherwise weaken the security of the separately calculated session secret is not used in deriving the session secret itself Irrespective of the particular technique used in generating session secrets, embodiments operate to separately generate a session secret by each of the nodes participating in the mutual authentication handshake so that the session secret (e.g., session key) does not pass over the links joining the nodes (e.g., network 101). Accordingly, in the illustrated embodiment process 205 is implemented by network-connected device 110 to calculate the session secret separately from process 206 implemented by network-connected device 120 to calculate the session secret.

The foregoing session secret is utilized according to embodiments of the invention to securely communicate the cluster secret from network-connected device 110 to network-connected device 120 via network 101, assuming the mutual authentication is successful. Accordingly, at process 207 of the illustrated embodiment network-connected device 110 encrypts the cluster secret (e.g. cluster key) using the session secret (e.g., session key) and transmits the encrypted cluster secret to network-connected device 120. For example, encryption of a cluster key using a session key at process 207 of embodiments may use AES-128 symmetric key encryption. However, other cryptographic key algorithms (e.g., other symmetric cryptographic key algorithms such as the International Data Encryption Algorithm (IDEA) and CAST-128 cryptographic algorithms) may be used according to embodiments of the invention. Session keys utilized according to embodiments of the invention do not rely on the use of a PKI or certificates in providing authentication of nodes and thus avoid the configuration and maintenance involved in a PKI or certificate management.

After having transmitted the cluster secret to network-connected device 120, the cluster joining session between network-connected devices 110 and 120 is completed as to network-connected device 110 according to embodiments of the invention and thus network-connected device 110 may then discard the session secret. Network-connected device 110 may operate to update a list of nodes which are validly part of the cluster to include newly joined network-connected device 120, such as for use in later cluster operations, according to embodiments. It should be appreciated that network-connected device 110 may communicate additional information, such as the aforementioned list of nodes which are validly part of the cluster, to network-connected device 120 (e.g., prior to discarding the session secret). Network-connected device 120 of embodiments decrypts the encrypted cluster secret received from network-connected device 110 using the session secret to obtain the cluster secret. After having decrypted the cluster secret received from network-connected device 110, the cluster joining session between network-connected devices 110 and 120 is completed as to network-connected device 120 according to embodiments of the invention and thus network-connected device 120 may then discard the session secret. Network-connected device 110 and/or network-connected device 120 may communicate information identifying network-connected device 120 as a cluster node to other nodes of the cluster (e.g., using the cluster secret).

Having possession of the cluster secret and cluster credentials, network-connected device 120 is a member (presently one of two members) of the cluster. Accordingly, in operation according to embodiments, network-connected device 120 trusts every other member in the cluster, and every other member in the cluster trusts network-connected device 120. Once joined, nodes of the cluster are enabled to communicate with other nodes of the cluster using various messaging techniques including unicast and multicast messaging through use of the cluster secret (e.g., encrypting the messages using a cluster key). That is, network-connected device 120 has been able to securely obtain the cluster secret that all other nodes of the cluster share and therefore network-connected device 120 may communicate with those nodes either individually (e.g., unicast communication) or collectively (e.g., multicast communication) using the cluster secret. Thus, future communication to/from any members in the cluster are secured using the cluster secret (e.g., encrypted with the cluster key) as represented by process 208 of the illustrated embodiment.

Encryption of messages using a cluster key at process 208 of embodiments may, for example, use AES-128 symmetric key encryption. However, other cryptographic key algorithms (e.g., other symmetric cryptographic key algorithms such as the International Data Encryption Algorithm (IDEA) and CAST-128 cryptographic algorithms) may be used according to embodiments of the invention. Cluster keys utilized according to embodiments of the invention do not rely on the use of a PKI or certificates in providing authentication of nodes and thus avoid the configuration and maintenance involved in a PKI or certificate management.

It should be appreciated that once authenticated with any node of the cluster, as described above, trust with respect to a joined node is established with the entire cluster of nodes. Thus, it is not necessary that a node joining the cluster authenticate against every node, or even more than one node, in the cluster according to embodiments herein. That is, the mutual authentication techniques as implemented according to embodiments herein provide a configuration in which each node is configured to both be a recipient of a cluster secret, facilitating the node itself to join the cluster, and a source of a cluster secret, facilitating other nodes to join the cluster. Accordingly, when a third node (e.g., a network-connected device similar to network-connected devices 110 and 120 of FIG. 1A) is to join the cluster formed to comprise network-connected devices 110 and 120 in FIG. 2, such a joining node may perform the mutual authentication and cluster secret sharing processes (e.g., perform processes 203-207 of FIG. 2) with any single node already part of the cluster (e.g., either network-connected device 110 or network-connected device 120) and establish trust and the ability to securely communicate with every node of the cluster (e.g., both network-connected device 110 and network-connected device 120). That is, since every node that has successfully joined the cluster has the cluster secret (e.g., cluster key), any node can communicate with any other node in the cluster. This allows unicast and multicast messages to be used for intra-cluster communication. As can be appreciated from the foregoing, the nodes are provided with multicast communication ability with only authenticating a single node in a cluster, as opposed to authenticating to every node in the cluster. This approach can scale to any size cluster.

Figure 3:
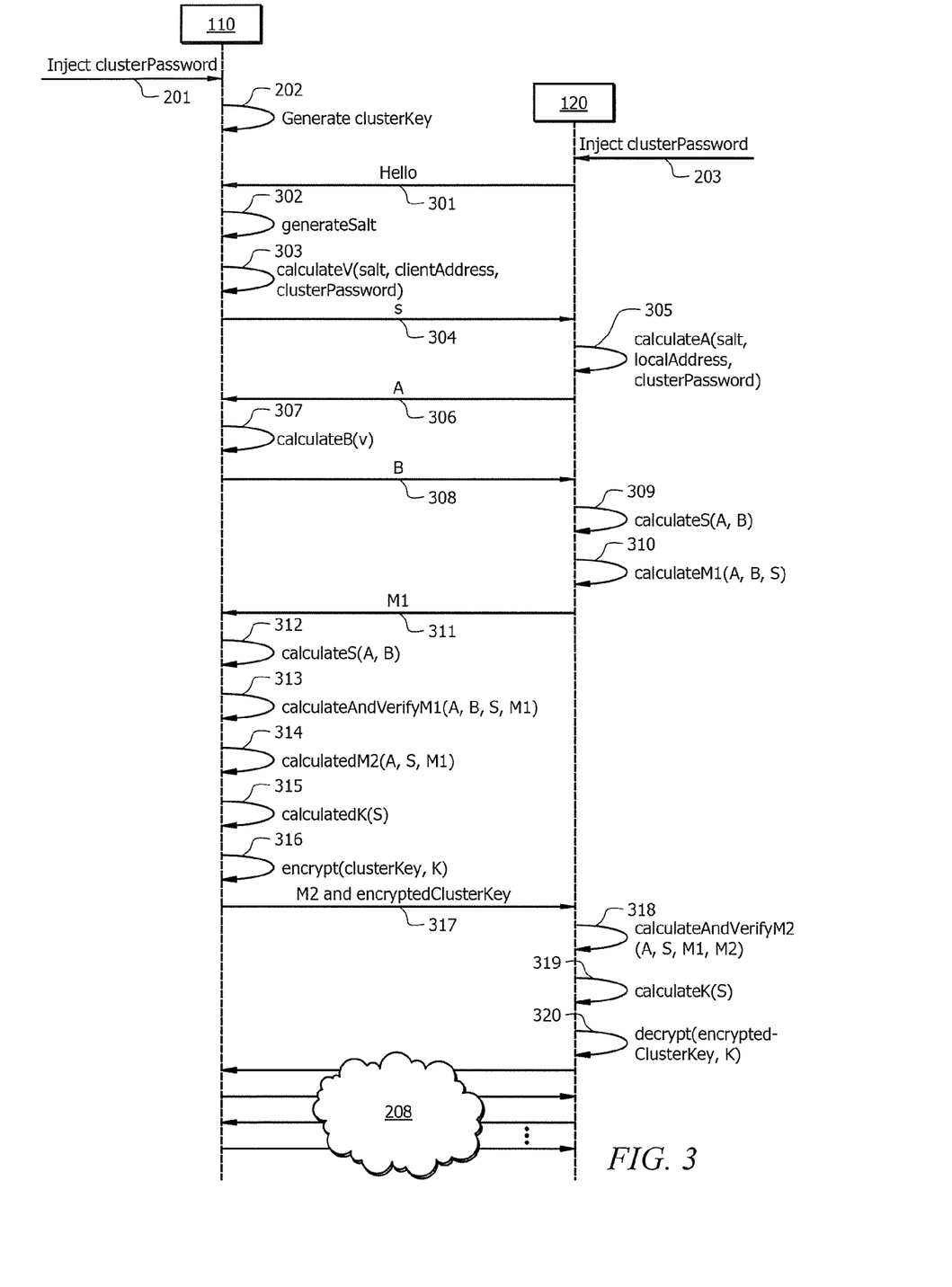
FIG. 3 shows a ladder diagram of a more detailed process flow enabling each node of a cluster to securely communicate with any other node of the cluster according to embodiments of the invention.

FIG. 3 shows details with respect to an embodiment of the process flow of FIG. 2 providing operation in which each node of the cluster is enabled to securely communicate with any other node of the cluster. Specifically, the ladder diagram of FIG. 3 provides details with respect to a mutual authentication protocol and a technique for session key generation as may be utilized according to embodiments of the invention. Accordingly, processes 301-320 of FIG. 3 provide details with respect to a process flow operable to provide mutual authentication in accordance with processes 204-207 of FIG. 2 and processes 315 and 319 provide details with respect to a process flow operable to provide separate session secret calculation in accordance with processes 205 and 206 of FIG. 2. Processes 201-203 and 208 of FIG. 3 correspond to processes 201-203 and 208 of FIG. 2 and processes 316, 317, 320 of FIG. 3 correspond to process 207 of FIG. 2. As with the process flow of FIG. 2, functionality of the process flow illustrated in FIG. 3 may be implemented in software whereby elements of embodiments of the present invention are essentially code segments operable upon a processor-based or computer system (e.g., network-connected devices 110, 120, and/or 130) to perform the necessary tasks. The program or code segments can be stored in a computer readable medium (e.g., the aforementioned memory of a respective one of network-connected devices 110-130).

The embodiment illustrated in FIG. 3 utilizes a modified configuration of the Secure Remote Password protocol version 6a (SRP-6a) in providing mutual authentication and separate session secret calculation. However, other authentication and key agreement protocols that provide mutual authentication of both parties involved and a shared secret known only to the two parties involved in the handshake may be utilized according to embodiments of the invention. Although the authentication protocol, key agreement protocols, and encryption algorithms used are presumed to be known to every node a priori, embodiments provided in accordance with the concepts herein may operate to dynamically select particular protocols and/or algorithms providing operation herein (e.g., through the nodes exchanging messages to agree upon a common set of protocols and algorithms before the handshake takes place).

In operation according to embodiments of the process flow illustrated in FIG. 3, the n and g values of the mutual authentication protocol are known to all nodes beforehand. For example, the values of n and g used in embodiments may be agreed upon by the two parties in question. They can be set in advance or a host can supply them to a client. In the latter case, the host should send the parameters in the first message along with the salt. For maximum security n should be a safe prime (e.g., a number of the form $n=2q+1$, where q is also prime). Also, g should be a generator modulo n, which means that for any x where $0<x<n$, there exist a value x for which $g^x$ %
n=x. However, alternative embodiments operate to return the n and g values (e.g., at process 304).

The K value of the mutual authentication protocol shown in the embodiment of FIG. 3 is used as a session key, and is calculated with a pseudo-random function (PRF) (e.g., the TLSv1 protocol, defined in RFC 2246 section 5, the disclosure of which is incorporated herein by reference). Any number of algorithms capable of expanding one secret (S) into another (K), however, may be utilized in calculating a session key according to embodiments of the invention.

It should be appreciated that the SRP-6a protocol was designed to be used between a client and a server, whereas the mutual authentication of the process flow illustrated in FIG. 3 is performed with respect to nodes of a cluster. In the client/server environment, the server typically stores the verifier (v) derived from the user's password, so that it does not store the user's password but may still operate to validate a client using the user's password. In the cluster implementation of the illustrated embodiment, each node to knows the cluster password (e.g., it may be injected by various means as described above) and thus the verifier (v) need not be used to store an obscured version of a user's password in the SRP-6a protocol. Therefore, the mutual authentication protocol illustrated in FIG. 3 is modified such that the salt (s) is generated and the verifier (v) is calculated (e.g., the cluster node name, address, or other information uniquely or substantially uniquely identifying the node joining the cluster may be utilized as the username in the calculation) on each authentication attempt (e.g., processes 302 and 303). Although necessitating the calculation of the verifier (v) on each authentication attempt, and thus placing burdens on processing power not well suited for the heavy demands of a server environment, the foregoing modification facilitates the use of the mutual authentication protocol by any of the nodes of the cluster, rather than its single point (server) use in the client/server model.

It should be appreciated that operation in which each node of the cluster is enabled to securely communicate with any other node of the cluster as provided by embodiments discussed above with reference to FIGS. 2 and 3 is not only scalable to any size cluster, but may be readily adapted to provide node attrition management and/or enhanced security protocols. For example, the techniques implemented by the foregoing process flows can be extended to provide periodic cluster key rotation. In operation according to an embodiment of periodic cluster key rotation, after a period of time has elapsed, a new cluster key is generated by a node, and every other node is made to reauthenticate to obtain the new cluster key. Note that the new cluster key is not distributed to other nodes using the current cluster key because, if a hacker or other unauthorized node has the current cluster key, the hacker or unauthorized node could simply decrypt and obtain the new cluster key. Such periodic cluster key rotation reduces the possible number of messages that can be decrypted if a hacker or other unauthorized node were to obtain or retain the cluster key, thereby providing enhanced security.

The concepts of the foregoing periodic cluster key rotation may be utilized with respect to nodes leaving the cluster to thereby provide node attrition management. A node leaving the cluster leaves open the possibility that the node that left the cluster would still be able to decrypt cluster messages. Accordingly, in operation according to an embodiment of cluster key regeneration, after a node leaves the cluster, a new cluster key is generated by a node, and every other node is made to reauthenticate to obtain the new cluster key. To prevent the node that left the cluster from eavesdropping on the mutual authentication handshakes in a cluster key regeneration implementation, and thus deriving the regenerated cluster key, a new cluster secret (e.g., cluster password) may be injected into the remaining nodes, without providing it to the node that left the cluster.

Techniques for providing enhanced security may place additional restrictions on the nodes allowed to join the cluster. For example, a roster of allowed nodes could be maintained. Any node attempting to join the cluster may both have to be present in this roster and complete the mutual authentication handshake in order to join the cluster.

Where a particular network-connected device fails to authenticate a certain number of times (e.g., 5) within a certain time period (e.g., 1 hour), then enhanced security techniques herein may operate to lock that network-connected device out of the mutual authentication process for a length of time before being allowed to re-attempt mutual authentication. Because each node of the cluster has the ability to mutually authenticate a node joining the cluster, authentication failure lockout information is preferably shared between the nodes of the cluster (e.g., using a cluster state of how many times a particular node has attempted to authenticate, using multicast communication facilitated through use of a cluster key, etc.). Such an authentication failure lockout technique prevents an active dictionary attack.

It should be appreciated that operation in which each node of the cluster is enabled to securely communicate with any other node of the cluster as provided by embodiments discussed above with reference to FIGS. 2 and 3 is not only readily adaptable to provide node attrition management and/or enhanced security protocols, but may also be readily adapted to facilitate operation in a number of different environments and/or scenarios. For example, after a node joins the cluster, encryption of messages with a cluster key could be selective to improve performance (e.g., in an environment where nodes having limited processing power are used). In one such embodiment, if a message is deemed to contain no sensitive material, it need not be encrypted, although some method (e.g., digital signature algorithms and/or other security techniques) to prevent tampering with better performance could then be employed. In an environment where the network is secured by other means (e.g. IPSec, or a secure segregated network), then encryption using a cluster key could be turned off completely.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing secure multicast communication capabilities to a plurality of nodes of a cluster, the method comprising:

performing a mutual authentication between a node joining the cluster and any single node validly part of the cluster comprising calculating, separately for a session associated with the mutual authentication, a verifier using cluster credentials possessed by the node joining the cluster and all nodes validly part of the cluster including the node of the cluster performing the mutual authentication;

determining whether the mutual authentication is successful; and communicating a cluster secret to the node joining the cluster using a secure communication channel unique to the mutual authentication session when the mutual authentication is determined to be successful, wherein the cluster secret renders the node joining the cluster a cluster node and enables the cluster node to securely communicate with every other node which is validly part of the cluster.

2. The method of claim 1, wherein the single node validly part of the cluster is a peer node of the node joining the cluster.

3. The method of claim 1, wherein the performing a mutual authentication comprises:

calculating a session key separately by the node joining the cluster and the single node, wherein the session key is unique to the mutual authentication session.

4. The method of claim 3, wherein the communicating a cluster secret comprises:

communicating a cluster key between the node joining the cluster and the single node using the session key.

5. The method of claim 1, wherein the cluster credentials comprise a cluster password injected separately into each of the node joining the cluster and the node of the cluster performing the mutual authentication.

6. The method of claim 1, wherein the cluster secret comprises a symmetrical cryptographic key.

7. The method of claim 1, further comprising:

regenerating the cluster secret periodically or upon a node resigning from the cluster; and requiring all the nodes validly part of the cluster to again perform a mutual authentication between each such node and another node of the cluster to obtain the regenerated cluster secret.

8. A method comprising:

performing a mutual authentication handshake between a first node of a cluster and a second node of the cluster comprising calculating, separately for a session associated with the mutual authentication handshake between the first node and the second node, a verifier using cluster credentials possessed by the first node and the second node;

communicating a cluster key between the first node and the second node using a secure communication channel established by the mutual authentication handshake between the first node and the second node;

performing a mutual authentication handshake between a third node of the cluster and one of the first node or second node comprising calculating, separately for a session associated with the mutual authentication handshake between the third node of the cluster and one of the first node or the second node, a second verifier using cluster credentials possessed by the third node and at least one of the first node or the second node;

communicating the cluster key between the third node and the one of the first node and second node using a secure communication channel established by the mutual authentication handshake between the third node and the one of the first node and the second node; and performing secure cluster communications between the first node, the second node, and the third node using the cluster key.

9. The method of claim 8, wherein performing the mutual authentication handshake between the first node and the second node comprises calculating a first session key separately by the first node and the second node, wherein the secure communication channel established by the mutual authentication handshake between the first node and the second node is secured using the first session key, and wherein performing the mutual authentication handshake between the third node and the one of the first node and the second node comprises calculating a second session key separately by the third node and the one of the first node and the second node, wherein the secure communication channel established by the mutual authentication handshake between the third node and the one of the first node and the second node is secured using the second session key.

10. The method of claim 8, wherein the secure cluster communications comprise unicast communications and multicast communications.

11. A system, comprising:
a processor coupled to a memory and configured to execute programmed instructions stored in the memory to perform steps comprising:
performing a mutual authentication between a node joining a cluster of nodes and any single node validly part of the cluster comprising calculating, separately for a session associated with the mutual authentication, a verifier using cluster credentials possessed by the node joining the cluster and all nodes validly part of the cluster including the node of the cluster performing the mutual authentication;
determining whether the mutual authentication is successful; and
communicating a cluster secret to the node joining the cluster using a secure communication channel unique to the mutual authentication session when the mutual authentication is determined to be successful, wherein the cluster secret renders the node joining the cluster a cluster node and enables the cluster node to securely communicate with every other node which is validly part of the cluster.

12. The system of claim 11, wherein the single node validly part of the cluster is a peer node of the node joining the cluster.

13. The system of claim 11, wherein the performing a mutual authentication comprises:
calculating a session key separately by the node joining the cluster and the single node, wherein the session key is unique to the mutual authentication session.

14. The system of claim 11, wherein the communicating a cluster secret comprises:
communicating a cluster key between the node joining the cluster and the single node using the session key.

15. The system of claim 11, wherein the cluster credentials comprise a cluster password injected separately into each of the node joining the cluster and the node of the cluster performing the mutual authentication.

16. The system of claim 11, wherein the cluster secret comprises a symmetrical cryptographic key.

17. The system of claim 11, wherein the processor is further configured to execute programmed instructions stored in the memory to perform steps further comprising:
regenerating the cluster secret periodically or upon a node resigning from the cluster; and
requiring all the nodes validly part of the cluster to again perform a mutual authentication between each such node and another node of the cluster to obtain the regenerated cluster secret.

\* \* \* \* \*